United States Patent [19]

Downs et al.

[11] Patent Number: 5,302,939
[45] Date of Patent: Apr. 12, 1994

[54] DUAL TIRE EQUALIZER HAVING REMOTE INDICATOR

[75] Inventors: Edward A. Downs, Charlotte, N.C.; Stephen McClelland, Portadown, Ireland

[73] Assignee: Schrader Automotive Inc., Charlotte, N.C.

[21] Appl. No.: 941,941

[22] Filed: Sep. 8, 1992

[51] Int. Cl.⁵ .......................................... B60C 23/00
[52] U.S. Cl. ...................................... 340/447; 340/442; 340/445; 73/146.5; 73/146.8; 116/34 R
[58] Field of Search ............... 340/442, 445, 447, 626, 340/590, 591, 592, 593, 665, 539; 362/802; 116/34 R; 73/146.4, 146.5, 146.8

[56] References Cited

U.S. PATENT DOCUMENTS

| | | | |
|---|---|---|---|
| 2,708,743 | 5/1955 | Dall'Olio Contri | 340/442 |
| 2,727,221 | 12/1955 | Sprigg | 340/626 |
| 3,296,590 | 1/1967 | Dalton | 340/447 |
| 3,533,063 | 10/1970 | Garcia | 340/626 |
| 4,286,253 | 8/1981 | Nagy | 340/447 |
| 4,438,344 | 3/1984 | Albert et al. | 362/802 |
| 4,468,650 | 8/1984 | Barbee | 340/447 |
| 4,510,484 | 4/1985 | Snyder | 340/447 |
| 4,539,928 | 9/1985 | Todhunter et al. | 116/34 R |
| 4,644,317 | 2/1987 | Aingworth | 340/447 |
| 5,061,917 | 10/1991 | Higgs et al. | 340/447 |
| 5,109,213 | 4/1992 | Williams | 340/447 |

Primary Examiner—Donnie L. Crosland
Attorney, Agent, or Firm—Dallett Hoopes

[57] ABSTRACT

The diaphragm of a dual tire equalizer has an axial probe actuating or not actuating a switch in a radio frequency transmitter circuit mounted on the wheel. The transmitter sends a signal varying, depending on the condition of the switch. A radio frequency receiver on the vehicle and connected to an indicator in the driver's cab responds to the signal and issues appropriate information to the driver concerning condition of the equalizer.

7 Claims, 2 Drawing Sheets

DUAL TIRE EQUALIZER HAVING REMOTE INDICATOR

BACKGROUND OF THE INVENTION

1. Field of the Invention

This invention relates to a dual tire pressure equalizer having means to communicate its status to the driver in his cab. Preferably, the communication means includes a radio frequency transmitter on the wheel and a receiver and display device in the cab.

2. Description of Related Art Including Information Disclosed Under §§1.97 to 1.99

U.S. Pat. No. 4,539,928 to Gordon R. Todhunter et al discloses a dual tire pressure equalizer and indicator. The equalizer in such devices normally has inlets from both tires, one being axial of the equalizer housing and the other being offset. A spring-pressed piston is provided in the housing, the spring urging the piston toward the axial inlet. Sealing means are provided usually in the form of a diaphragm transverse of the housing, and the piston presses the diaphragm to seat against the axial inlet when pressure is low in the chamber above the diaphragm. This seating cuts off communication between the two tires so that if one tire goes flat, they do not both go flat. A tire fill connection is provided in the housing.

Thus, in operation both tires may be filled through the fill connection by way of the chamber. Thereafter, the equalizer assures that both tires are at equal pressure to assure equal tire wear. When one tire develops a leak, the pressure in the chamber will drop and the spring will move the diaphragm to seat as described, cutting off communication.

The leak in a tire in the system described above can progress while the truck is actually speeding down the highway, and the driver will be none the wiser. Condition of the equalizer can only be known by checking its indicator when the truck is stopped.

In the prior art there have been other dual tire pressure equalizers and indicators. Examples are in the U.S. Pat. No. 2,427,445 which issued Sep. 16, 1947 to A. H. Davidson and the U.S. Pat. No. 1,882,455 which issued Oct. 11, 1932 to D. H. Spicer.

Using radio to transmit tire pressure information generally is disclosed in the U.S. Pat. Nos. 4,210,898 and 4,273,728 to Betts. Other examples are disclosed in Wang U.S. Pat. No. 5,001,457 and Karbo 4,160,234.

SUMMARY OF THE INVENTION

The present invention enables the driver to become instantly aware that a leak has progressed to the point where the equalizer has closed off communication between the two tires. This will enable him to put in for servicing at the next available stop.

The invention may be summarized as having two components: on the wheel there is a housing having a transverse diaphragm defining an upper and lower chamber. The upper chamber has inlets from the two tires and thus equalizes them. One inlet is disposed axially of the housing; the other is offset. A spring-pressed diaphragm and the diaphragm will close off the axial inlet when the equalized pressure drops below a preset minimum. An elongate probe is disposed under the diaphragm and engages a switch actuator when the diaphragm is remote the axial inlet and disengages it when the diaphragm closes off the axial inlet. A radio transmitter, also mounted on the wheel, transmits different signals when the switch is engaged or disengaged.

On the vehicle, preferably adjacent to or in the cab, is a radio receiver responsive to the transmitter, and a tire-condition-indicator is connected to the receiver and is intelligible to the driver.

BRIEF DESCRIPTION OF THE DRAWINGS

Further objects and features of the invention will be apparent from the following specification and the drawings, all of which disclose a non-limiting embodiment of the invention. In the drawings.

DESCRIPTION OF THE PREFERRED EMBODIMENT

Figure 1:
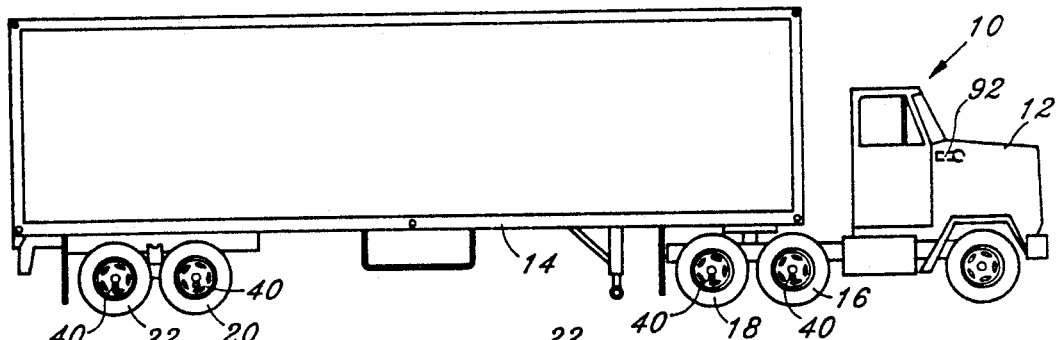
FIG. 1 is a simplified side elevational view of a truck having sets of dual tires.

FIG. 1 is a simplified view of a truck 10 on which the system of the invention has been installed. It comprises a tractor 12 and a trailer 14 articulated together in the conventional way. The forward wheels of the tractor are single steering wheels whereas the rear wheels 16 and 18 of the tractor and the rear wheels 20 and 22 of the trailer are dual tire wheels. It is on such dual tire sets that the system of the invention is to be installed.

Figure 2:
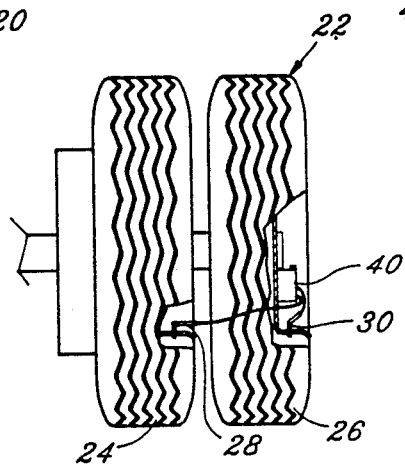
FIG. 2 is an enlarged diagramatic front view, partly broken away, of a set of dual tires onto which an equalizer embodying the invention has been installed and shown symbolically.

FIG. 2 is a view of the rear set 22. It comprises the inboard tire 24 and the outboard tire 26. The inboard tire 24 has the conventional fill valve to which is joined the inboard tire outlet hose 28, and the outboard tire 26 has the conventional fill valve to which is joined the outboard tire outlet hose 30. These tubes are connected to the assembly 40 which includes the equalizing means and the radio transmitter.

Figure 5:
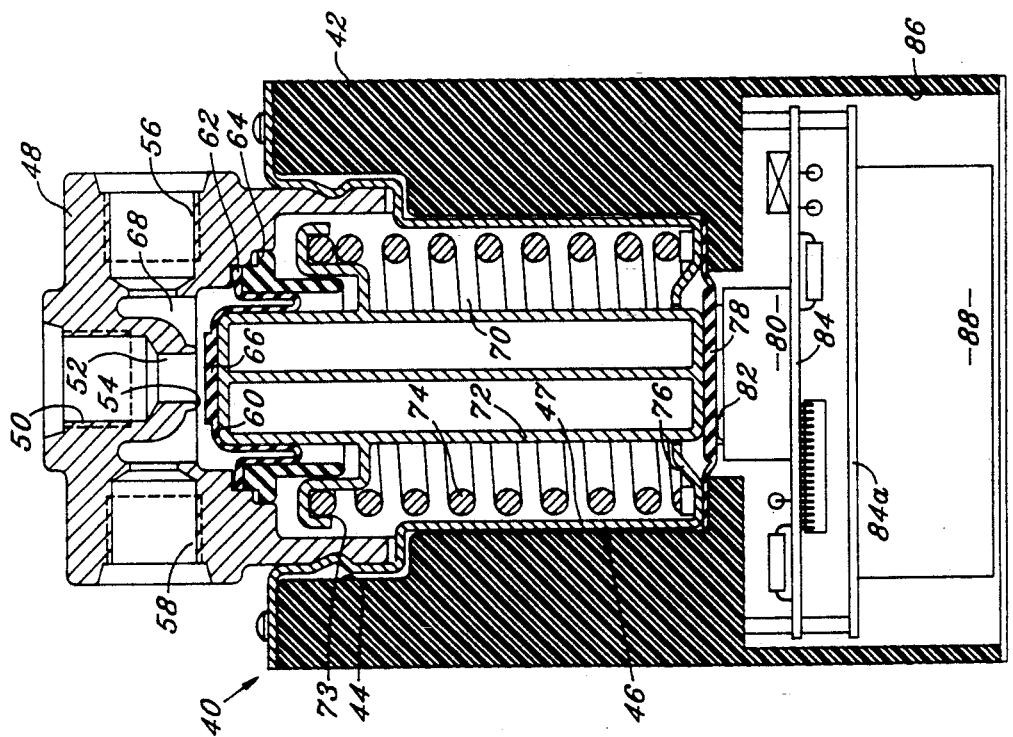
FIG. 5 is a greatly enlarged sectional view of an equalizer embodying the invention shown in the position in which the diaphragm permits communication between the two tires.

Referring now to FIG. 5, the assembly 40 comprises a cylindrical plastic body 42 having a stepped recess 44 into which the lower end of the equalizer 46 is inserted and mounted.

The equalizer comprises a tubular shell 47 of metal. Preassembled to the shell 47 is the cast or mold and machined fitting 48. In the assembly the shell 47 is crimped inward as shown, into an annular groove in the lower end of the fitting. The fitting is formed with an axial connection 50 to which is connected one of the inlet hoses 28 or 30. The connection 50 communicates with a valve opening 52 having a seat 54. To either side of the fitting 48 is a connection, fill connection 56 and a second tire connection 58 to which the other tire hose 28, for instance, may be connected.

A roll-type diaphragm 60 transverse of the fitting has its periphery clamped in place between a shoulder 62 in the fitting and a forced-in plastic collar 64. Centrally the diaphragm may be thickened at 66 as shown to provide a valve which is able to engage the seat 54 and close off communication between the two tires. The recess of the fitting above the diaphragm 60 defines an equalizing or upper chamber 68.

The recess beneath the diaphragm 60 enclosed by the fitting and the shell defines a lower chamber 70.

An elongated probe 72 which is preferably a cylindrical molded element has an outward flange intermediate its ends including the downwardly facing annular trough 73. A spiral spring 74 nests in the trough 73 and extends downward to bear on a washer disposed on bottom 76 of the shell 47. The central portion of the bottom 76 of the shell is apertured to permit passage of the probe 72. Clamped between the bottom 76 of the shell 47 and an annular shoulder at the bottom of the stepped recess 44 is a membrane 78.

From the underside the body 42 has an upward cavity 86 which joins the stepped recess as shown. Disposed in the cavity and secured to the body 42 for support are a pair of spaced parallel circuit boards 84 and 84a. Supported on the upper board 84 a microswitch 80 is disposed under the membrane 78. An actuator 82 extends upward from the switch.

The normal function condition of the equalizer 46 is shown in FIG. 5. The upper chamber 68 connected to both tires through connections 50 and 58 is sufficiently pressurized so that the diaphragm 60 is driven against the force of spring 74 downward away from seat 54 by the pressure, permitting the two tires to communicate. This equalizes the pressure in the tires. Because the diaphragm is in its downward position, the probe 72 is also downward and presses down on membrane 78 depressing the switch actuator 82.

Figure 6:
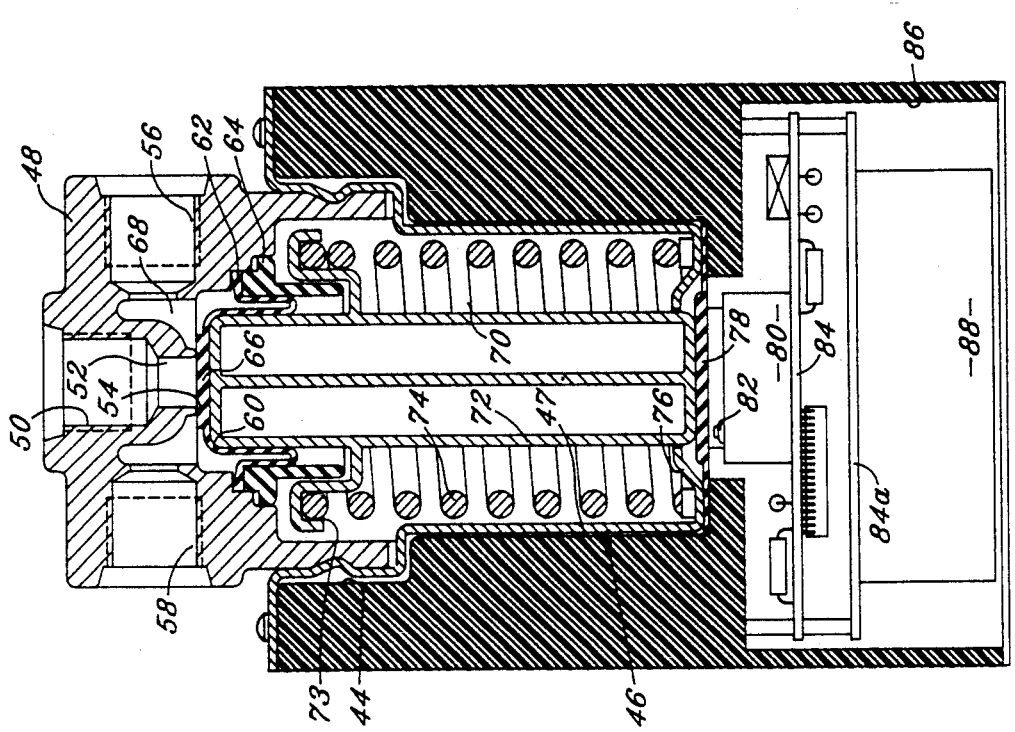
FIG. 6 is a sectional view similar to FIG. 5 but showing the diaphragm in a position shutting off communication.

The diaphragm 60 of FIG. 6 is shown in its upward position closing valve opening 52 because the pressure within the chamber 68 is not sufficient to drive the diaphragm downward against the force of spring 74 and permit communication of the pressure in the two tires through the valve opening. In this upper position the diaphragm permits the probe 72 to assume upward position so that the diaphragm 78 does not engage or depress switch actuator 82.

Figure 3:
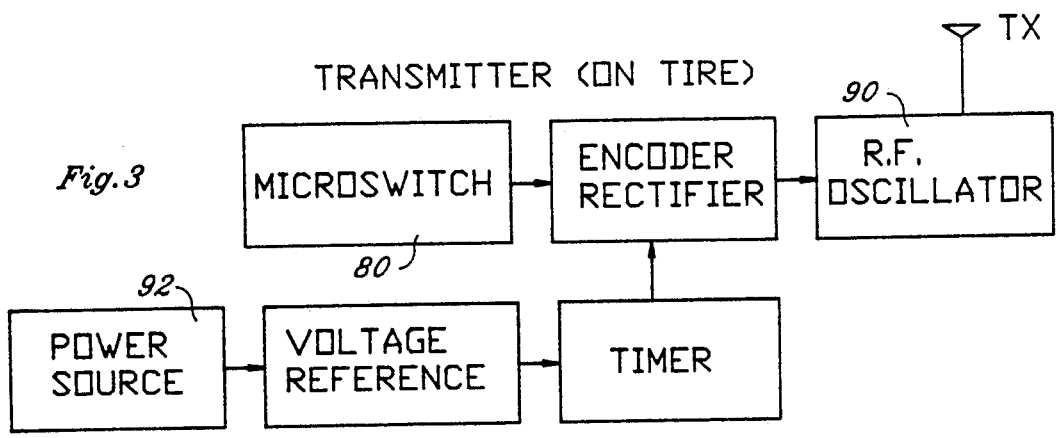
FIG. 3 is a block diagram of a transmitter embodying the invention.
Figure 4:
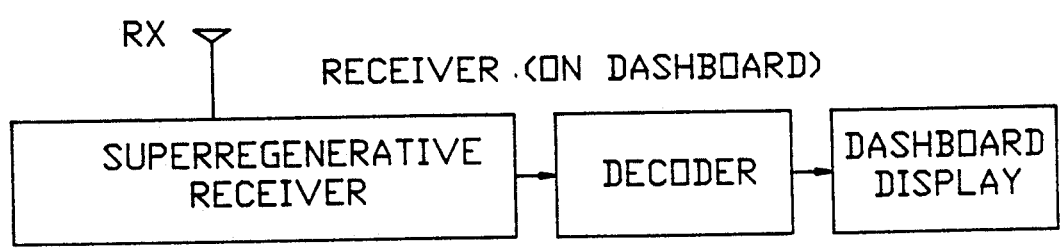
FIG. 4 is a block diagram of the receiver embodying the invention.

Referring now to FIG. 3, switch 80, the "microswitch", is designated in the block diagram and whether it is opened or closed will affect the signal emanating from the radio frequency oscillator 90.

Transmitter

The circuitry involved on the board 84 and in the enclosure 88 on board 84a of FIGS. 5 and 6 includes a power source 92 (FIG. 3) which may be in the form of a vibration actuated generator or even a primary-cell battery.

If the power supply is a vibration generator, the preferred item is a piezo ceramic generator including a small stainless steel beam (not shown) fixed at one end of the housing. The beam moves in free space at the other end which may be attached thereto a large lead weight. The beam moves in free space at the free end and acts on road vibration, vehicle acceleration and braking. The power generated by the beam is taken off via two connecting leads.

The timer circuit acts to rectify the AC power of the generator via a diode bridge. The output of the rectifier is used to charge up a large capacitor to provide a DC voltage for the rest of the circuit. This voltage may vary from 0 volts and the beginning of a journey up to a maximum of 18 volts. A zener diode stops the voltage rising above 18 volts. A timer circuit driven by this DC voltage provides the tranmitter with two operating modes. In the first operating mode the transmitter circuit is completely disabled and drawing no current. The only circuit in operation in this mode is the timer circuit which is designed to draw only a very tiny current (1 uA-2 uA). This allows the power produced from the generator during driving to charge up the capacitor and to maintain a fairly high DC voltage on this capacitor.

The timer circuit meanwhile is in its charge mode running up to a pre-defined point, say 60 seconds. At the end of this 60 second wait the mode of operation changes and the timer goes into discharge mode for a short period, typically 0.2 seconds. During the discharge mode the timer circuit enables the transmitter circuit. At the end of this 0.2 seconds the timer reverts to the 60 second charge mode. The timer circuit shown carries out this charge and discharge mode continuously while only consuming a tiny current. The timer circuit described here is not necessarily the only method and other approaches such as a custom IC would also be acceptable.

As stated, during the discharge mode of the timer the transmitter circuit is enabled, and the UHF oscillator then transmits digital encoded data from the encoder IC. The encoder chip is driven from a voltage reference chip which sets the supply to the encoder and hence the oscillator to 5 volts. The two ICs and the oscillator are turned on in the timer discharge mode for 0.2 seconds during which time the power necessary is provided by stored charge which has built up its voltage over the 60 second charge-up period.

Provided the voltage on the storage capacitor at the start of the discharge period is higher than 8 volts, then the discharge period will last for 0.2 seconds, and the final voltage of the capacitor will be around 5.5 volts. If, however, the initial voltage is less than 8 volts, say 6 volts, then sometime during the discharge period, the capacitor voltage drops below 5.5 volts causing the reference voltage to drop below 5 volts. At this point an error flag is produced and used to immediately end the discharge mode thus ensuring no transmission is made with an oscillator supply voltage less than 5 volts. This reduces power consumption when only low voltages have been attained.

The encoder chip is such that 5 bits of its 9 bit output are used for a security address, and the remaining 4 bits are used for data output. In the present embodiment, the 5 bits could be used for vehicle model identification.

Three of the four bits of data will be used for pressure equalizer condition (hi, lo) and wheel position. One bit is unused although it could be incorporated as an additional address bit. This arrangement of encoder IC and UHF oscillator is quite common, particularly in security systems, such as car alarms and door openers, etc.

The oscillator is preferably a stabilized, quartz-based oscillator tuned to the required frequency. Frequency choice is dependent on the country of use and their particular regulations.

Receiver

The receiver portion of this system is placed somewhere (FIG. 1) in the truck cab, preferably behind the dashboard at a point at which it can adequately receive the signals from all wheels. The receiver is made up of conventional super regenerative receiver and various other elements, such as a micro-controller. The design of the receiver is critical for the performance of the system and is broadly based on existing receivers used for telemetry devices, such as burglar alarms, car door openers, etc.

The decoding of the data from each wheel allows the receiver to send signals to a display box which can have warning lights for each wheel or only one overall warning light, and a system fail light which checks for signal generation at each wheel. It is a feature of the receiver that any data adequately received momentarily is latched in for further processing.

The invention is not limited to the embodiment shown, but the invention is instead defined by the scope of the following claim language, expanded by an extension of the right to exclude as is appropriate under the doctrine of equivalents.

What is claimed is:

1. A tire pressure equalizer and remote pressure indicator system for dual tires mounted on a set of wheels on a vehicle body comprising:
   (A) on the set of wheels:
      (1) a housing having a first chamber and a second chamber separated by a transverse sealed diaphragm, the first chamber having:
         (a) a valve seat opposite the diaphragm, with a central opening, the diaphragm being adapted to seat and close off the seat,
         (b) first passage means for connecting the seat opening and one tire.
         (c) second passage means for connecting the first chamber to the other tire, and
         (d) fill means communicating with the first chamber;
      (2) a rigid hollow tubular elongate probe disposed in the second chamber with one end thereof engaging the diaphragm opposite the seat, the probe being formed with an outward annular web having an annular trough directed away from the diaphragm,
      (3) spring means in the second chamber encircling the probe and compressively disposed between the trough and a housing part remote from the diaphragm and urging the probe and diaphragm toward seating disposition,
      (4) electric switch means having a first and second condition disposed adjacent the other end of the probe adapted to be changed from first to second condition thereby when the diaphragm moves from seated to unseated position,
      (5) a radio transmitter including a power supply in circuit with the switch;
   (B) on the vehicle body;
      (1) a radio receiver spaced from the transmitter and responsive thereto,
      (2) tire condition indicator means connected to the receiver; whereby as pressure drops from a selected pressure, the diaphragm and elongate probe driven by the spring, move to seat and the condition of the switch is changed to indicate to the indicator means a less-than-selected pressure, and the diaphragm in seating isolates the two tires.

2. A tire pressure equalizer and pressure indicator system as claimed in claim 1 wherein a second diaphragm separates the lower end of the probe from the switch.

3. A tire pressure equalizer and remote pressure indicator system as claimed in claim 1 wherein the power supply is in the form of a vibrator generator.

4. A tire pressure equalizer and remote pressure indicator system as claimed in claim 1 wherein the power supply is in the form of a primary-cell battery.

5. A tire pressure equalizer and remote pressure indicator system as claimed in claim 1 wherein the transmitter includes an encoder imparting to the signal the identity of the wheel as well as the condition of the equalizer, and the receiver includes a decoder which interprets the code and sends corresponding impulses to the indicator means.

6. A tire pressure equalizer and remote pressure indicator system as claimed in claim 5 wherein the indicator means is a dashboard display.

7. A tire pressure equalizer and remote pressure indicator system for dual tires mounted on a set of wheels on a vehicle body comprising:
   (A) on the set of wheels:
      (1) a housing having a first chamber and a second chamber separated by a transverse sealed diaphragm, the first chamber having:
         (a) a valve seat opposite the diaphragm, with a central opening, the diaphragm being adapted to seat and close off the seat,
         (b) first passage means for connecting the seat opening and one tire,
         (c) second passage means for connecting the first chamber to the other tire, and
         (d) fill means communicating with the first chamber;
      (2) a rigid elongate probe disposed in the second chamber with one end thereof engaging the diaphragm opposite the seat, the probe being formed with an outward projection,
      (3) spring means in the second chamber encircling the probe and compressively disposed between the projection and a housing part remote from the diaphragm and urging the probe and diaphragm toward seating disposition,
      (4) electric switch means having a first and second condition disposed adjacent the other end of the probe adapted to be changed from first to second condition thereby when the diaphragm moves from seated to unseated position,
      (5) flexible membrane means disposed between the said other end of the probe and the switch,
      (6) a radio transmitter including a power supply in circuit with the switch;
   (B) on the vehicle body:
      (1) a radio receiver spaced from the transmitter and responsive thereto,
      (2) tire condition indicator means connected to the receiver;
   whereby as pressure drops from a selected pressure, the diaphragm and elongate probe driven by the spring move to seat and the condition of the switch is changed to indicate to the indicator means a less-than-selected pressure, and the diaphragm in seating isolates the two tires.

* * * * *